United States Patent
Nakano

(10) Patent No.: US 7,363,050 B2
(45) Date of Patent: Apr. 22, 2008

(54) MOBILE STATION, BASE STATION, AND WIRELESS COMMUNICATION SYSTEM

(75) Inventor: Hiroyuki Nakano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 382 days.

(21) Appl. No.: 11/130,246

(22) Filed: May 17, 2005

(65) Prior Publication Data

US 2006/0171348 A1 Aug. 3, 2006

(30) Foreign Application Priority Data

Feb. 1, 2005 (JP) .............................. 2005-024870

(51) Int. Cl.
*H04Q 7/20* (2006.01)
*H04Q 7/24* (2006.01)
*H04M 1/00* (2006.01)

(52) U.S. Cl. .................. 455/525; 455/524; 455/550.1; 455/556.2; 455/561; 455/562.1; 455/575.7; 370/328; 370/338

(58) Field of Classification Search ............ 455/550.1, 455/556.2, 560–561, 562.1, 452.1–452.2, 455/453, 464, 446, 509, 418, 434, 62, 403, 455/25, 41.2, 63.1–63.4, 67.11, 68–70, 422.1, 455/423–425, 450–451, 513–517, 524–526, 455/115.1, 82, 115.3, 101, 19, 575.7; 370/328–329, 370/334, 338–339, 431, 341; 343/700 R, 343/703, 714, 745, 824, 777–778, 751, 835, 343/853, 893; 342/147, 155, 157–158, 367–368, 342/381, 417, 359–360, 422–424, 427–430, 342/432–434, 437, 445, 449
See application file for complete search history.

(56) References Cited

U.S. PATENT DOCUMENTS

| | | | |
|---|---|---|---|
| 7,069,051 B1* | 6/2006 | Katz | 455/562.1 |
| 7,103,022 B2* | 9/2006 | Yoshino et al. | 370/330 |
| 7,212,499 B2* | 5/2007 | Hoffmann et al. | 370/252 |
| 2003/0139197 A1* | 7/2003 | Kostic et al. | 455/525 |
| 2005/0094558 A1* | 5/2005 | Lu | 370/229 |

FOREIGN PATENT DOCUMENTS

| | | |
|---|---|---|
| JP | 11-225105 | 8/1999 |
| JP | 2001-016149 | 1/2001 |
| JP | 2003-219451 | 7/2003 |

* cited by examiner

*Primary Examiner*—Meless Zewdu
(74) *Attorney, Agent, or Firm*—Bingham McCutchen LLP

(57) ABSTRACT

An object of the present invention is to provide a wireless communication system that can quickly accomplish the selection and switching of a base station with which a mobile station is to connect, and that can efficiently distribute base station load resulting from the connection with the mobile station. The mobile station MT comprises: an adaptive array antenna 10 whose directivity can be controlled in any desired direction; a directivity control unit 20 which controls the direction of directivity of the adaptive array antenna 10; a base station identifying unit 21 which gathers identification information from each of the base stations in a surrounding area by changing the direction of directivity of the adaptive array antenna 10 under control of the directivity control unit 20; and a base station selecting unit 22 which selects an appropriate one of the base stations whose identification information has been gathered.

4 Claims, 17 Drawing Sheets

FIG.12

| SSID | |
|---|---|
| DIRECTION | AZIMUTH ANGLE [DEGREES] |
| | ELEVATION ANGLE [DEGREES] |
| RECEPTION STRENGTH [dBm] | |
| NUMBER OF MOBILE TERMINALS BEING SERVED | |
| TOTAL THROUGHPUT VALUE [Mps] | |
| CPU LOAD RATE [%] | |

FIG.14

| DATA ITEM | | AP1 | AP2 | AP3 | ... |
|---|---|---|---|---|---|
| SSID | | 1234 | 2345 | 3456 | ... |
| DIRECTION | AZIMUTH ANGLE [DEGREES] | 15 | 134 | 270 | ... |
| | ELEVATION ANGLE [DEGREES] | 45 | 10 | -30 | ... |
| RECEPTION STRENGTH [dBm] | | -55 | -40 | -80 | ... |
| NUMBER OF MOBILE TERMINALS BEING SERVED | | 4 | 2 | 1 | ... |
| TOTAL THROUGHPUT VALUE [Mps] | | 9.8 | 6.1 | 2.1 | ... |
| CPU LOAD RATE [%] | | 99 | 75 | 30 | ... |

MOBILE STATION, BASE STATION, AND WIRELESS COMMUNICATION SYSTEM

CROSS REFERENCE TO RELATED APPLICATION

This application is based upon, and claims the benefit of priority from, the prior Japanese Patent Application No. 2005-024870, filed on Feb. 1, 2005, the entire contents of which are incorporated herein by reference.

BACKGROUND OF THE INVENTION

1. Field of the Invention

The present invention relates to a wireless communication system comprising a plurality of base stations installed within a wireless communication network and mobile stations which perform wireless communication with such base stations and, more particularly, to a wireless communication system which may be advantageously used for the construction of a wireless LAN system. Such wireless LAN systems are spreading rapidly in such places as offices and hot-spots.

2. Description of the Related Art

In recent years, wireless LAN systems using wireless communication systems have been spreading rapidly in offices of various companies as corporate LANs and in hot-spots set up in shops or in public facilities.

Usually, a wireless LAN system comprises, as described in Japanese Unexamined Patent Publication No. 2001-16149, a communication network such as the Internet or an intranet, a host computer connected to the communication network, a mobile station (mobile node) for a user to access the host computer, and a base station as an access point which performs wireless communication with the mobile station and enables the mobile station to access the host computer by delivering transmit data placed on the communication network to the mobile station or transmitting data received from the mobile station onto the communication network.

In such a wireless LAN system, a personal computer or a personal digital assistant (PDA) is often used as the mobile station, and the user at the mobile station performs wireless communication with the base station by using a wireless LAN function built into the personal computer or personal digital assistant or, if such a wireless LAN function is not built in, then by providing the necessary wireless LAN function by installing a wireless LAN card in an expansion slot of the mobile station.

In many cases, conventionally-used wireless LAN functions and wireless LAN cards have built-in antennas whose directivity is almost omnidirectional. Such omnidirectional antennas permit communications in all directions, but are not suitable for achieving selective communication functions.

Accordingly, when a plurality of base stations are installed one adjacent to another to cover mobile stations located within a given area, the area is divided into smaller areas each one covered by a base station so as to prevent interference with radio waves radiated from adjacent base stations.

Then, when there arises a need for the mobile station to switch to another base station as the mobile station moves around, the mobile station receives identification information called a beacon frame that every base station transmits, and switches to the new serving base station based on the base station identifier (for example, SSID: Service Set Identifier) included in the received beacon frame. With such a method, the mobile station can switch its serving base station to the nearest base station as it moves around.

SUMMARY OF THE INVENTION

As described above, in the prior art wireless LAN system, switching of the serving base station, which becomes necessary as the mobile station moves, is usually initiated when identification information is received from the nearest base station. Accordingly, the mobile station cannot actively select its serving base station, but the selection process is rather passive; this has given rise to the following problems.

That is, when a certain mobile station is continuously performing communication while it is moving around, the need arises to switch its serving base station from one station to another, but in the prior art wireless LAN system, as a waiting time unavoidably occurs to receive the identification information, there has been the problem that a delay occurs in accomplishing the switching or that an inappropriate base station is selected.

Further, in the prior art wireless LAN system in which a plurality of base stations are installed one adjacent to another with each base station serving its own coverage area, the mobile station is usually connected to the nearest base station. Accordingly, in the prior art wireless LAN system, when there are many mobile stations, the degree of concentration of load differs from one base station to another depending on how many mobile stations are being served by each base station, and this has led to the problem that it is difficult to constantly maintain maximum communication efficiency for the system as a whole.

In view of the above problems, it is an object of the present invention to provide a wireless communication system that can quickly accomplish the selection and switching of a base station with which to connect a mobile station, and that can efficiently distribute base station load.

To achieve the above object, according to the present invention, the mobile station is equipped with an adaptive array antenna whose directivity can be controlled in any desired direction, and the mobile station gathers identification information from each base station in a surrounding area by changing the direction of directivity of the adaptive antenna.

BRIEF DESCRIPTION OF THE DRAWINGS

The present invention will be more clearly understood from the description as set forth below with reference to the accompanying drawings, wherein:

FIG. 12 is a diagram showing the data structure of access point information that is gathered from each access point in the access point identification routine;

FIG. 14 is a table showing one example of the access point information gathered from the access points;

DESCRIPTION OF THE PREFERRED EMBODIMENTS

Figure 1:
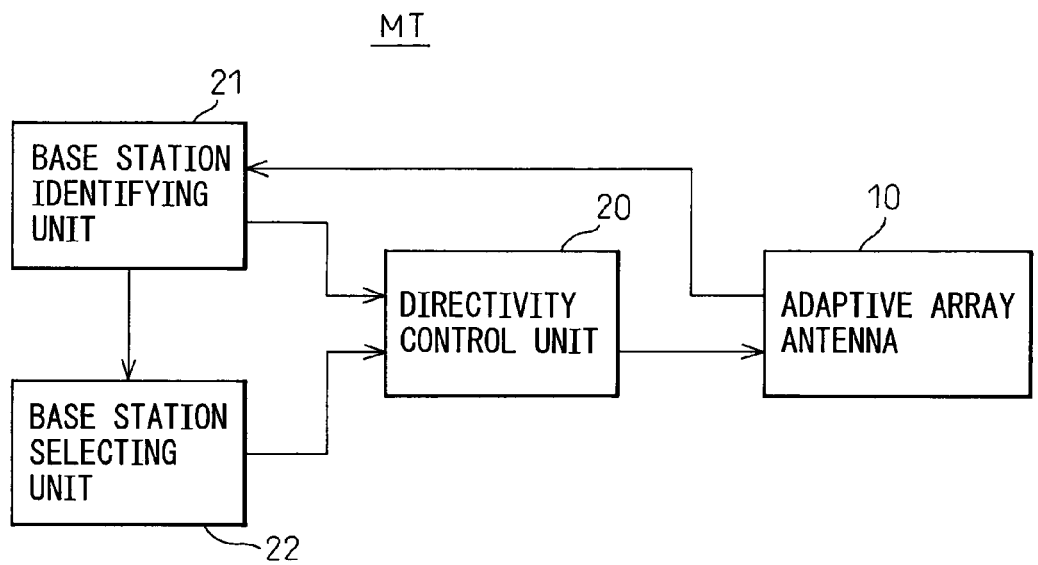
FIG. 1 is a diagram showing the basic functional configuration of a mobile station according to the present invention.

The basic principle of the present invention will be described with reference to FIGS. 1 and 2. FIG. 1 is a diagram showing the basic functional configuration of a mobile station according to the present invention. The mobile terminal MT as the mobile station comprises: an adaptive array antenna 10 whose directivity can be controlled in any desired direction; a directivity control unit 20 which controls the direction of directivity of the adaptive array antenna 10; a base station identifying unit 21 which gathers identification information from each base station in a surrounding area by changing the direction of directivity of the adaptive antenna 10 under control of the directivity control unit 20; and a base station selecting unit 22 which selects an appropriate one of the base stations whose identification information has been gathered.

Figure 2:
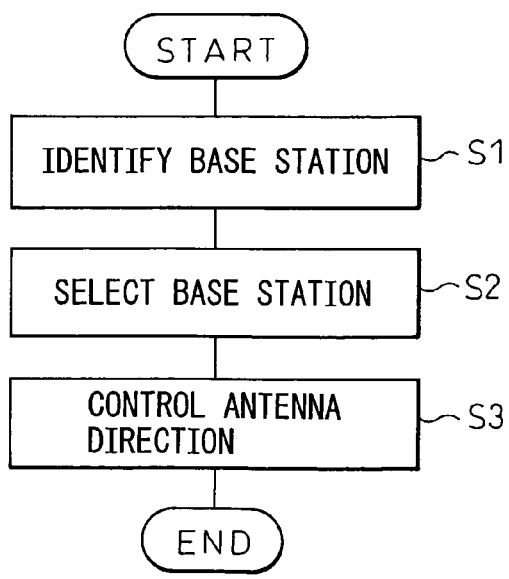
FIG. 2 is a flowchart showing one example of the operation of the mobile station shown in FIG. 1.

FIG. 2 is a flowchart showing one example of the operation of the mobile terminal MT shown in FIG. 1. First in step S1, when selecting the serving base station as the mobile terminal MT moves, the base station identifying unit 21 gathers identification information from each base station in the surrounding area by changing the direction of directivity of the adaptive antenna 10 under control of the directivity control unit 20. When gathering the identification information, the base station identifying unit 21 transmits an identification information transmit request signal toward the directions in which the directivity of the adaptive antenna 10 is oriented, and receives the identification information from the base station located in that directions. The term direction here includes azimuth angle and/or elevation angle.

Next, in step S2, the base station selecting unit 22 selects an appropriate one of the base stations whose identification information has been gathered. Here, the base station identifying unit 21 receives, from each base station, load information indicating its current load condition, and the base station selecting unit 22 can select the appropriate one of the base stations based on their load conditions. Alternatively, the mobile terminal MT may further comprise a radiowave strength measuring unit (not shown) which measures the strength of the radiowave received from each base station, and a radiowave strength storing unit (not shown) which store the received radiowave strength for each base station whose identification information has been gathered, with provisions made so that the base station selecting unit 22 selects, from among the base stations, the base station for which the received radiowave strength currently measured shows the largest increase from the received radiowave strength previously measured and stored in the radiowave strength storing unit.

Then, in step S3, the mobile terminal MT initiates wireless communication with the base station selected by the base station selecting unit 22, by orienting the directivity of the adaptive array antenna 10 in the direction of the selected base station under control of the directivity control unit 20.

A base station according to the present invention comprises a load monitoring unit which monitors its own load condition. The base station further comprises a load reporting unit which, when performing wireless communication with the mobile terminal, reports the load condition to the mobile terminal by transmitting thereto the load information indicating the load condition.

The base station further comprises a connection rejecting unit which rejects a communication connection request issued from the mobile terminal if the load condition exceeds a predetermined threshold.

A wireless communication system according to the present invention includes a wireless communication network, a plurality of base stations, each identical to the one described above, installed within the wireless communication network, and the mobile terminal described above which performs wireless communication with the base stations.

The mobile terminal can quickly accomplish the selection and switching of its serving base station by actively gathering identification information from each base station in the surrounding area.

Figure 3A:
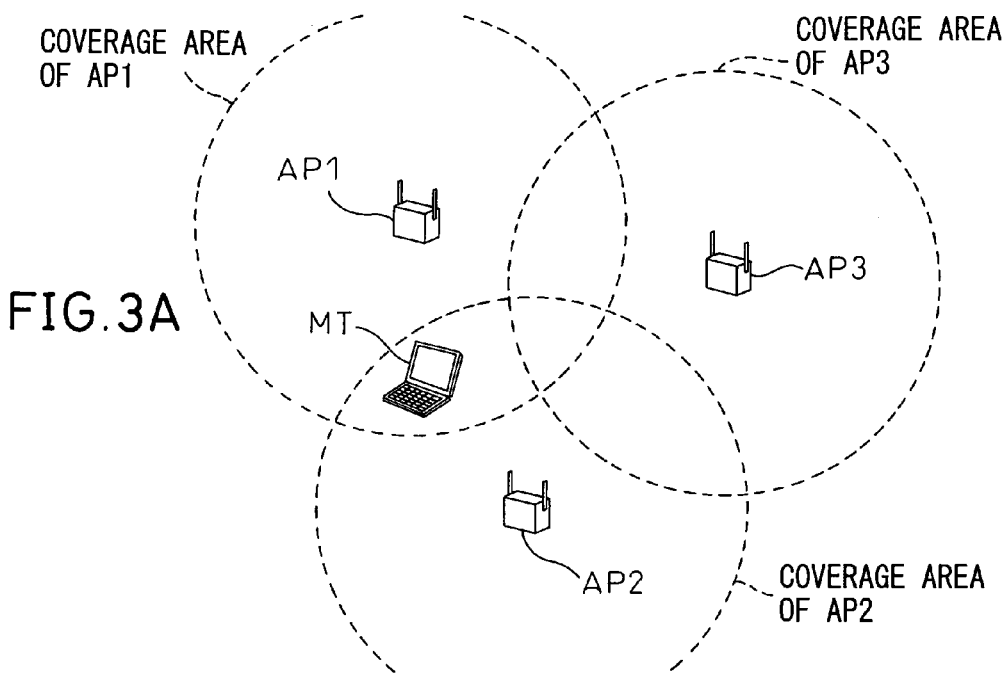
FIG. 3A is a diagram showing the coverage areas of base stations in a prior art wireless communication system in which the mobile station is equipped with an omnidirectional antenna.
Figure 3B:
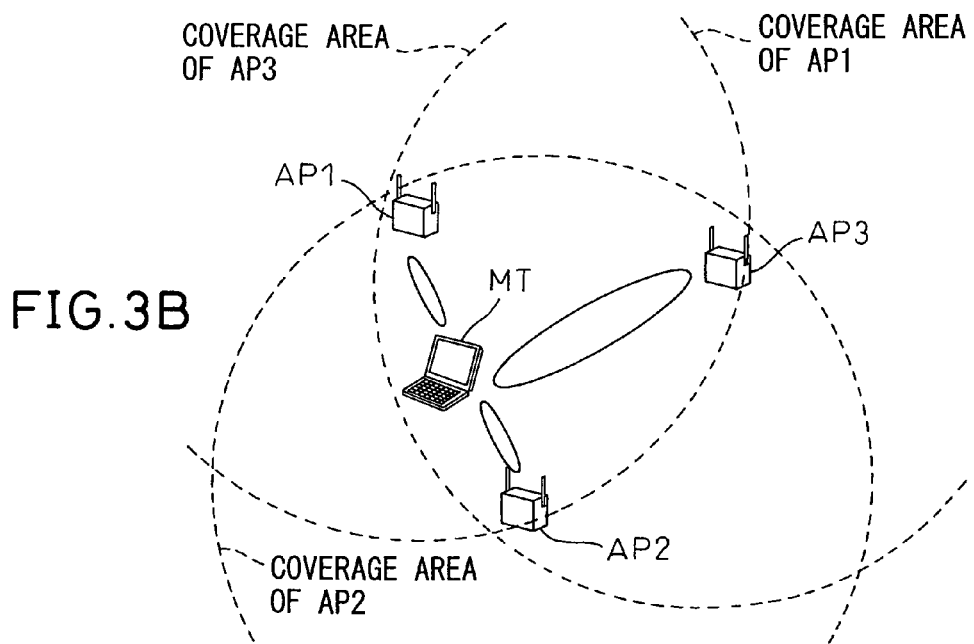
FIG. 3B is a diagram showing the coverage areas of base stations in a wireless communication system according to the present invention.

Further, with the provision of the adaptive array antenna, the radiowave beam that the mobile terminal directs to the base station to perform communication can be made narrow, and the mobile terminal coverage area of each base station can be enlarged as shown in FIG. 3B, while avoiding interference with other base stations adjacent to it. Here, FIG. 3A is a diagram showing the coverage areas of base stations AP1 to AP3 in the prior art wireless communication system in which the mobile terminal MT is equipped with an omnidirectional antenna, and FIG. 3B is a diagram showing the coverage areas of the base stations AP1 to AP3 in the wireless communication system of the present invention in which the mobile terminal MT is equipped with an adaptive array antenna.

In this way, by employing the adaptive array antenna, it becomes possible to connect to the base stations AP1 to AP3 distributed over a wider area than in the prior art. As a result, when selecting the serving base station from among the base stations AP1 to AP3, the mobile terminal MT is provided with a wider selection to choose from than in the prior art, and can thus select the most lightly loaded base station, achieving efficient distribution of the load over the base stations.

Further, when selecting the serving base station from among the base stations AP1 to AP3, if provisions are made to select the base station that shows the largest increase in received radiowave strength, the mobile terminal can select the base station to which the mobile terminal is closing faster, and this eventually contributes to improving the reception quality.

In principle, the mobile terminal can actively select its serving base station, but since each base station is equipped with a connection rejecting unit, the load can be prevented from concentrating on one particular base station.

Figure 4:
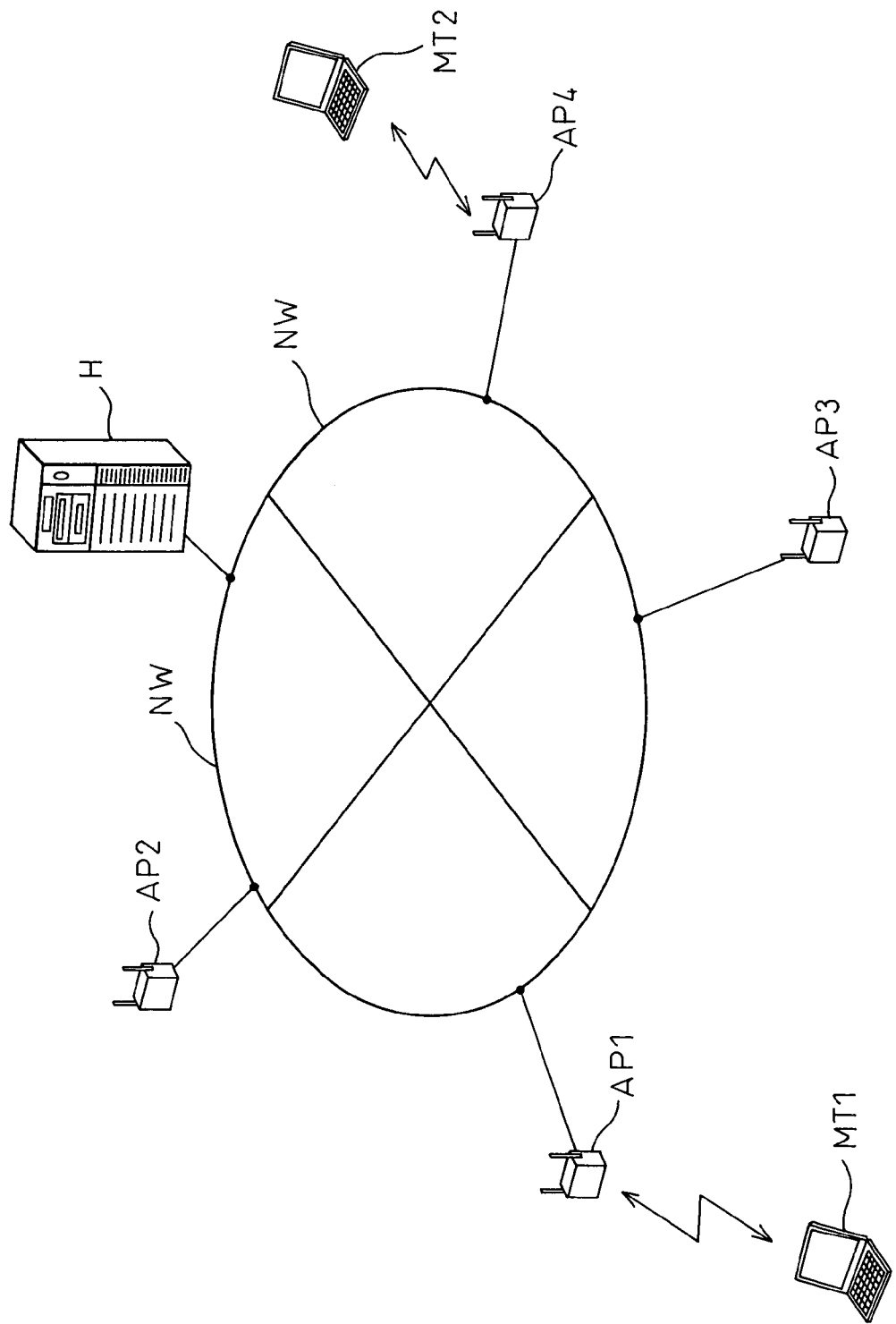
FIG. 4 is a diagram showing the configuration of a wireless communication system according to an embodiment of the present invention.

An embodiment of the present invention will now be described with reference to the accompanying drawings. FIG. 4 is a diagram showing the configuration of a wireless communication system according to the embodiment of the present invention. As shown, the wireless communication system comprises a wireless communication network NW, at least one host computer H, a plurality of access points (AP1 to AP4 in the figure) as base stations installed within the wireless communication network NW, and at least one mobile terminal (MT1 and MT2 in the figure) as a mobile station which performs wireless communication with the access points. The mobile terminals MT1 and MT2 shown here are various types of mobile terminals having a wireless communication function, such as personal computers, portable telephones, or personal digital assistants (PDAs), that can access the wireless communication network NW and the host computer by performing wireless communication with the access points.

In the following description, it is assumed that the mobile terminals MT1 and MT2 are personal computers (PCs). Further, in the following description, when referring to the plurality of mobile terminals MT1 and MT2 collectively, they may be simply designated MT by omitting the suffix (1 and 2), and likewise, when referring to the plurality of access points AP1 to AP4 collectively, they may be simply designated AP by omitting the suffix (1 to 4).

Figure 5:
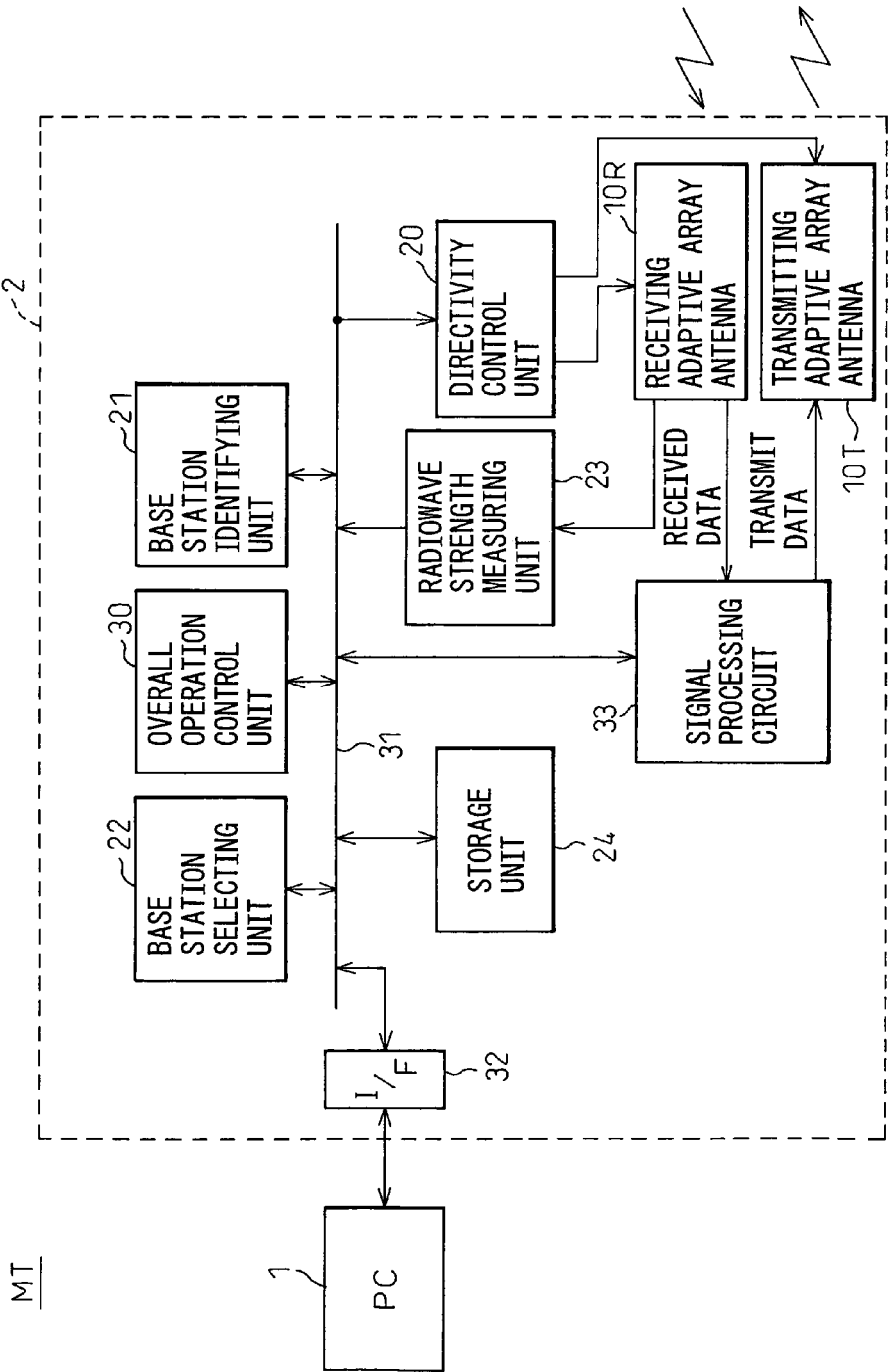
FIG. 5 is a diagram schematically showing one configuration example of a mobile terminal according to the embodiment of the present invention.

One configuration example of the mobile terminal MT according to the embodiment of the present invention shown in FIG. 4 is schematically shown in FIG. 5. The mobile terminal MT comprises a personal computer 1 and a wireless communication unit 2 which provides a wireless communication capability such as a wireless LAN capability to the personal computer 1. The wireless communication unit 2 may be implemented, for example, in the form of a wireless LAN card which is installed in an expansion slot of the personal computer 1 to provide the wireless communication capability to it, or may be originally built into the personal computer 1.

The wireless communication unit 2 comprises: an overall operation control unit 30 which controls the overall operation of the wireless communication unit 2; a data bus 31; an interface (I/F) 32 via which data to be transmitted to or received from the wireless communication network NW and various control signals related to the wireless communication unit 2 are transferred to and from the personal computer 1; a signal processing circuit 33 which modulates the transmit data input via the interface 32 into a wireless transmission signal in accordance with a prescribed modulation scheme, and demodulates the wireless receive signal received from the wireless communication network NW into receive data in accordance with a prescribed demodulation scheme; and a storage unit 24 which temporarily stores the transmit data until the modulation is completed and the demodulated receive data until it is transferred to the personal computer 1. The storage unit 24 is also used to store access point information to be described later and various programs, control data, and work data necessary for the operation of the overall operation control unit 30.

The wireless communication unit 2 further comprises: receiving and transmitting adaptive array antennas 10R and 10T whose directivity can be controlled in any desired direction; a directivity control unit 20 which controls the direction of directivity of each of the adaptive array antennas 10R and 10T; a base station identifying unit 21 which gathers identification information from each of the base stations AP1 to AP4 in the surrounding area by changing the direction of directivity of each of the adaptive array antennas 10R and 10T; a base station selecting unit 22 which selects an appropriate one of the base stations whose identification information has been gathered; and a radiowave strength measuring unit 23 which measures a dBm value representing the strength of the radiowave power received by the receiving adaptive array antenna 10R.

In FIG. 5, the directivity control unit 20, the base station identifying unit 21, and the base station selecting unit 22 are shown as separated from the overall operation control unit 30, but all or some of these units may each be implemented as a software module to be executed by the overall operation control unit 30, and stored in the storage unit 24 so that the software module is read out as needed by the overall operation control unit 30 for execution.

Figure 6:
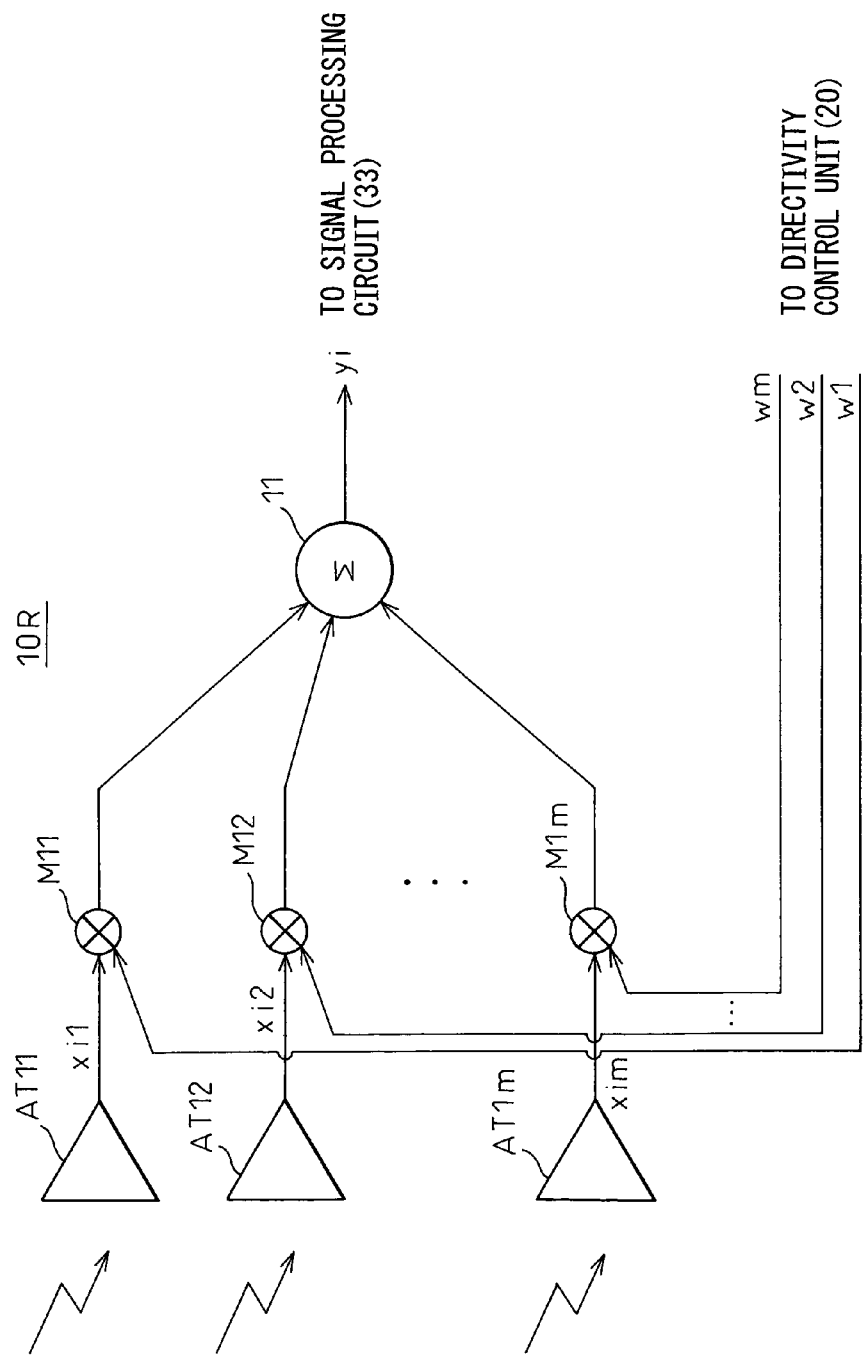
FIG. 6 is a diagram schematically showing one configuration example of a receiving adaptive array antenna shown in FIG. 5.

One configuration example of the receiving adaptive array antenna 10R shown in FIG. 5 is schematically shown in FIG. 6.

The receiving adaptive array antenna 10R comprises: a plurality of antenna elements AT11 to AT1$m$ each having directivity oriented toward a particular direction; weighting multipliers M11 to M1$m$ for weighting the received signals from the respective antenna elements AT11 to AT1$m$ in accordance with weighting factor signals w1 to wm supplied from the directivity control unit 20 shown in FIG. 5; and a combiner 11 for combining the received signals weighted by the respective weighting multipliers M11 to M1$m$. Here, when the received signals from the antenna elements AT11 to AT1$m$ are denoted by xi1 to xim, and the weighting factor signals from the directivity control unit 20 are denoted by w1 to wm, then the array output signal yi output from the combiner 11 is given by $$yi = w1 \times wi1 + w2 \times xi2 + \ldots + wm \times xim$$

As the received signal from only the antenna element AT11 to AT1$m$ directed toward the desired direction can be obtained, the directivity of the receiving adaptive array antenna 10R can be controlled in any desired direction.

Figure 7:
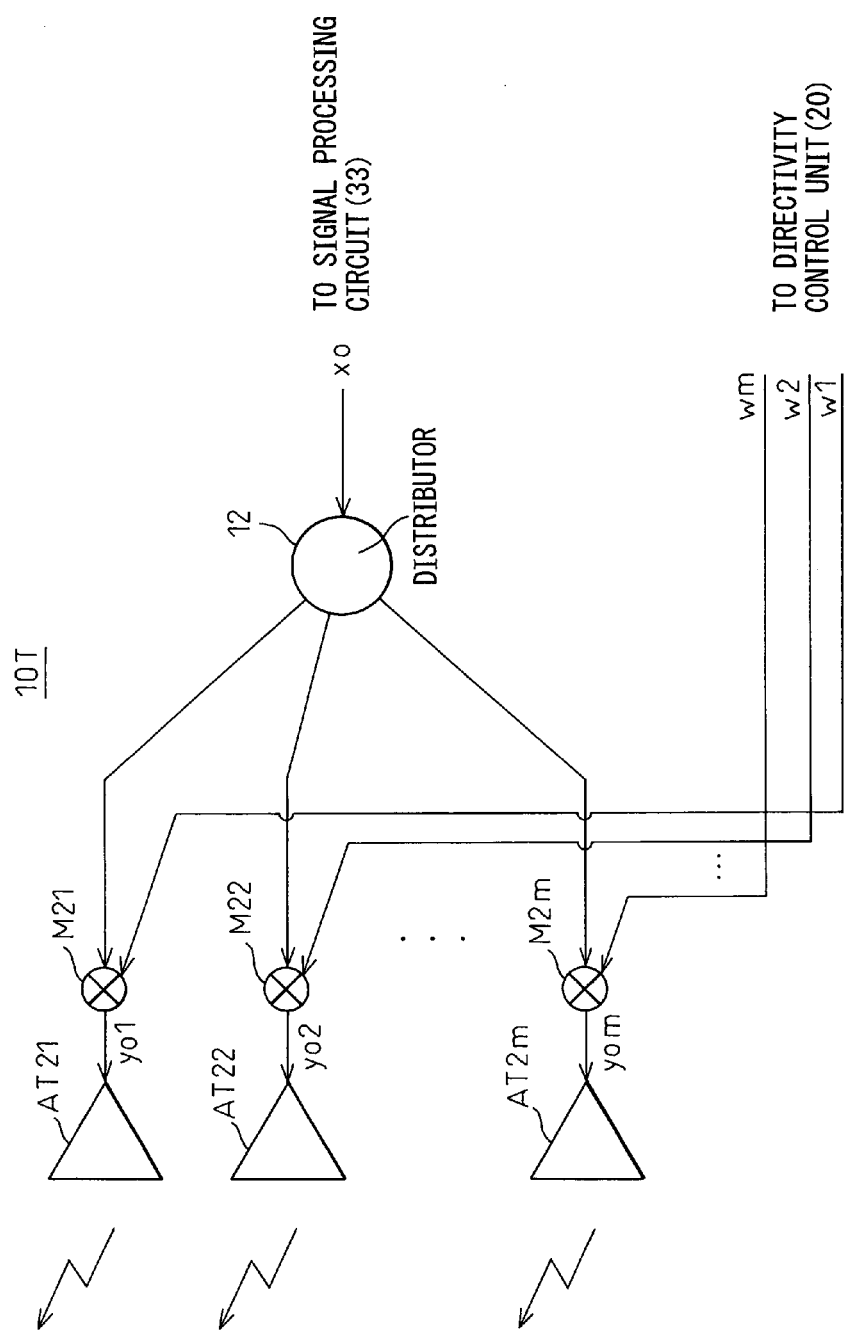
FIG. 7 is a diagram schematically showing one configuration example of a transmitting adaptive array antenna shown in FIG. 5.

One configuration example of the transmitting adaptive array antenna 10T shown in FIG. 5 is schematically shown in FIG. 7. The transmitting adaptive array antenna 10T comprises: a plurality of antenna elements AT21 to AT2$m$ each having directivity oriented toward a particular direction; weighting multipliers M21 to M2$m$ for weighting the transmit signals to the respective antenna elements AT21 to AT2$m$ in accordance with weighting factor signals w1 to wm supplied from the directivity control unit 20 shown in FIG. 5; and a distributor 12 for distributing the wireless transmission signal to the respective weighting multipliers M21 to M2$m$. Here, when the wireless transmission signal is denoted by xo, and the weighting factor signals by w1 to wm, then the transmit signals yo1 to yom to be supplied to the antenna elements AT21 to AT2m are respectively given by $$yo1=w1 \times xo1, yo2=w2 \times xo2, \ldots, yom=wm \times xom$$

As the transmit signal can be transmitted from only the antenna element AT21 to AT2m directed in the desired direction, the directivity of the transmitting adaptive array antenna 10T can be controlled in any desired direction.

Figure 8:
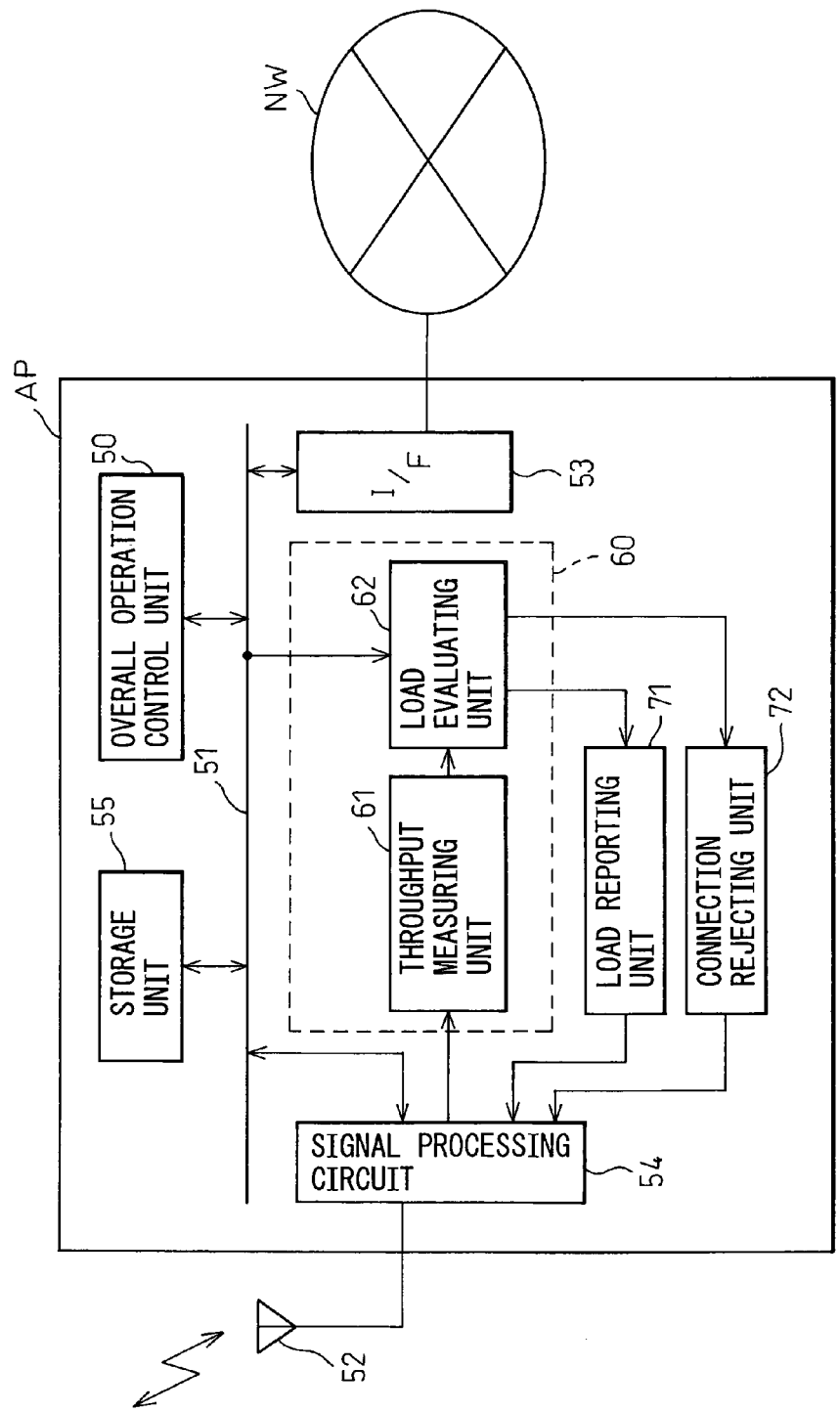
FIG. 8 is a diagram schematically showing one configuration example of an access point according to the embodiment of the present invention.

One configuration example of the access point AP according to the embodiment of the present invention shown in FIG. 4 is schematically shown in FIG. 8. As shown, the access point AP installed within the wireless communication network NW comprises: an overall operation control unit 50 which controls the overall operation of the access point AP; a data bus 51; an antenna 52 for transmitting and receiving wireless signals to and from the mobile terminal MT; an interface 53 via which transmit/receive data to be transmitted to or received from the mobile terminal MT is transferred to and received from the wireless communication network NW; a signal processing circuit 54 which demodulates the wireless receive signal received by the antenna 52 into receive data in accordance with a prescribed demodulation scheme, and modulates the transmit data input via the interface 53 into a wireless transmission signal in accordance with a prescribed modulation scheme; and a storage unit 55 which temporarily stores the transmit data until the modulation is completed and the demodulated receive data until it is transmitted out on the wireless communication network NW. The storage unit 55 is also used to store various programs, control data, and work data necessary for the operation of the overall operation control unit 50.

The access point AP further comprises: a load monitoring unit 60 which monitors the load of the access point AP resulting from communication with the mobile terminal MT being serviced; a load reporting unit 71 which generates, based on an output signal of the load monitoring unit 60, load information indicating the load condition of the access point AP, and reports the load condition to the mobile terminal MT by transmitting the load information to it via the signal processing circuit 54; and a connection rejecting unit 72 which, based on an output signal of the load monitoring unit 60, rejects a communication connection request issued from the mobile terminal MT if the load condition of the access point AP exceeds a predetermined threshold.

The load monitoring unit 60 includes: a throughput measuring unit 61 which measures a throughput value when the signal processing circuit 54 transmits and receives data to and from each mobile terminal MT; and a load evaluating unit 62 which store information concerning the mobile terminals MT under the control of the access point AP, i.e., the mobile terminals MT being served by the access point AP, and the number of such mobile terminals MT, and evaluates and store the throughput value associated with each of the mobile terminals MT.

In FIG. 8, the throughput measuring unit 61, the load evaluating unit 62, the load reporting unit 71, and the connection rejecting unit 72 are shown as separated from the overall operation control unit 50, but all or some of these units may each be implemented as a software module to be executed by the overall operation control unit 50, and stored in the storage unit 55 so that the software module is read out as needed by the overall operation control unit 50 for execution.

Figure 9:
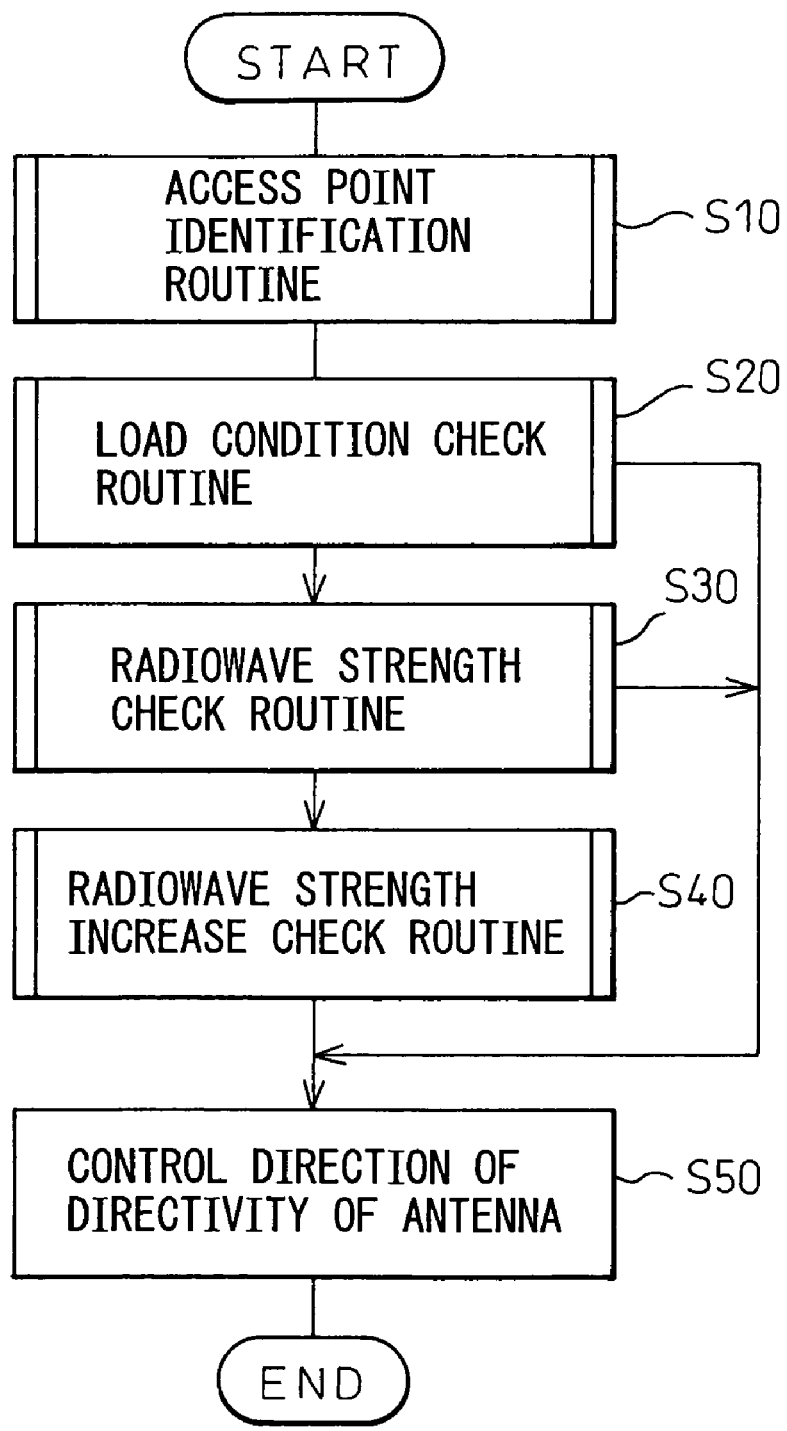
FIG. 9 is a general flowchart illustrating by way of example the operation of the mobile terminal shown in FIG. 5.

The operation of the mobile terminal MT shown in FIG. 5 will be briefly described below, by way of example, with reference to FIGS. 9 and 10. FIG. 9 is a general flowchart illustrating, by way of example, the operation of the mobile terminal MT shown in FIG. 5, and FIG. 10 is a schematic diagram for explaining how the mobile terminal MT shown in FIG. 5 switches from one serving access point AP to another as it moves around.

Figure 10:
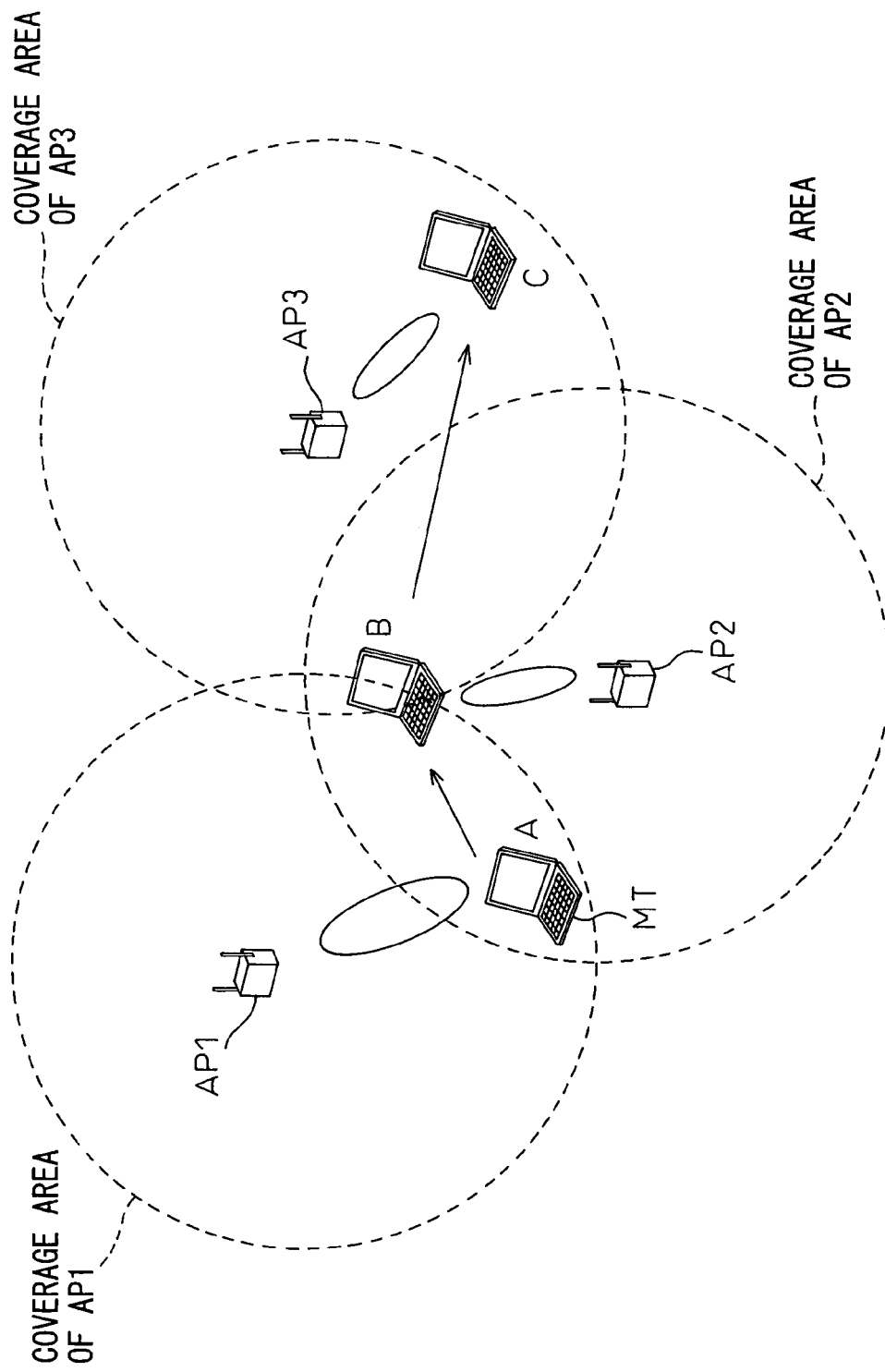
FIG. 10 is a schematic diagram for explaining how the mobile terminal shown in FIG. 5 switches from one serving access point to another as it moves around.

A situation where there are three access points AP1 to AP3 in the area surrounding the mobile terminal MT and the moving mobile terminal MT changes its position from A to B and then from B to C, as shown in FIG. 10 will be used as an example. In FIG. 10, the coverage areas of the respective access points AP1 to AP3, where the mobile terminal MT is served, are shown by dashed lines.

Referring back to FIG. 9, in step S10 the base station identifying unit 21 in the mobile terminal MT actively gathers identification information from each of the access points AP1 to AP3 in the surrounding area by changing the direction of directivity of each of the adaptive antennas 10T and 10R through all directions under control of the directivity control unit 20.

In the example of FIG. 10, when the mobile terminal MT is located at position A, the mobile terminal MT can gather identification information from the access points AP1 and AP2; when it is located at position B, it can gather identification information from the access points AP1 to AP3; and when it is located at position C, it can gather identification information only from the access point AP3.

The identification information that the mobile terminal MT gathers from the access points AP1 to AP3 is identifier information for uniquely identifying the respective access points AP1 to AP3; here, the previously mentioned SSID (Service Set Identifier) may be used. Further, each of the access points AP1 to AP3 may transmit its identification information to the mobile terminal MT by means of a beacon frame.

To actively gather the identification information, the mobile terminal MT, before transmitting its own data, or periodically, transmits an identification information request signal to the access points AP1 to AP3 in the surrounding area by changing the direction of directivity of the transmitting adaptive antenna 10T through all directions under control of the directivity control unit 20.

Then, by orienting the receiving adaptive antenna 10R in the same direction as the direction toward which the transmitting adaptive antenna 10T is directed, the mobile terminal MT receives the identification information returned from the access point that received the identification information request signal.

In each of the check routines S20 to S40, the base station selecting unit 22 selects as its serving access point an appropriate one of the access points whose identification information has been gathered as described above. The details of the check routines S20 to S40 will be described later.

Thereafter, in step S50, the direction of each of the adaptive array antennas 10T and 10R is oriented, under control of the directivity control unit 20, toward the access point selected by the base station selecting unit 22, and communication with the selected access point is thus commenced.

In this way, the mobile terminal MT can actively gather information concerning the access points located in the surrounding area, and can determine the access point switching time by itself as it moves around. Accordingly, quick access point switching can be achieved compared with the passive switching operation as practiced in the prior art in which the switching was made after waiting for the reception of identification information from the nearest base station.

Figure 11:
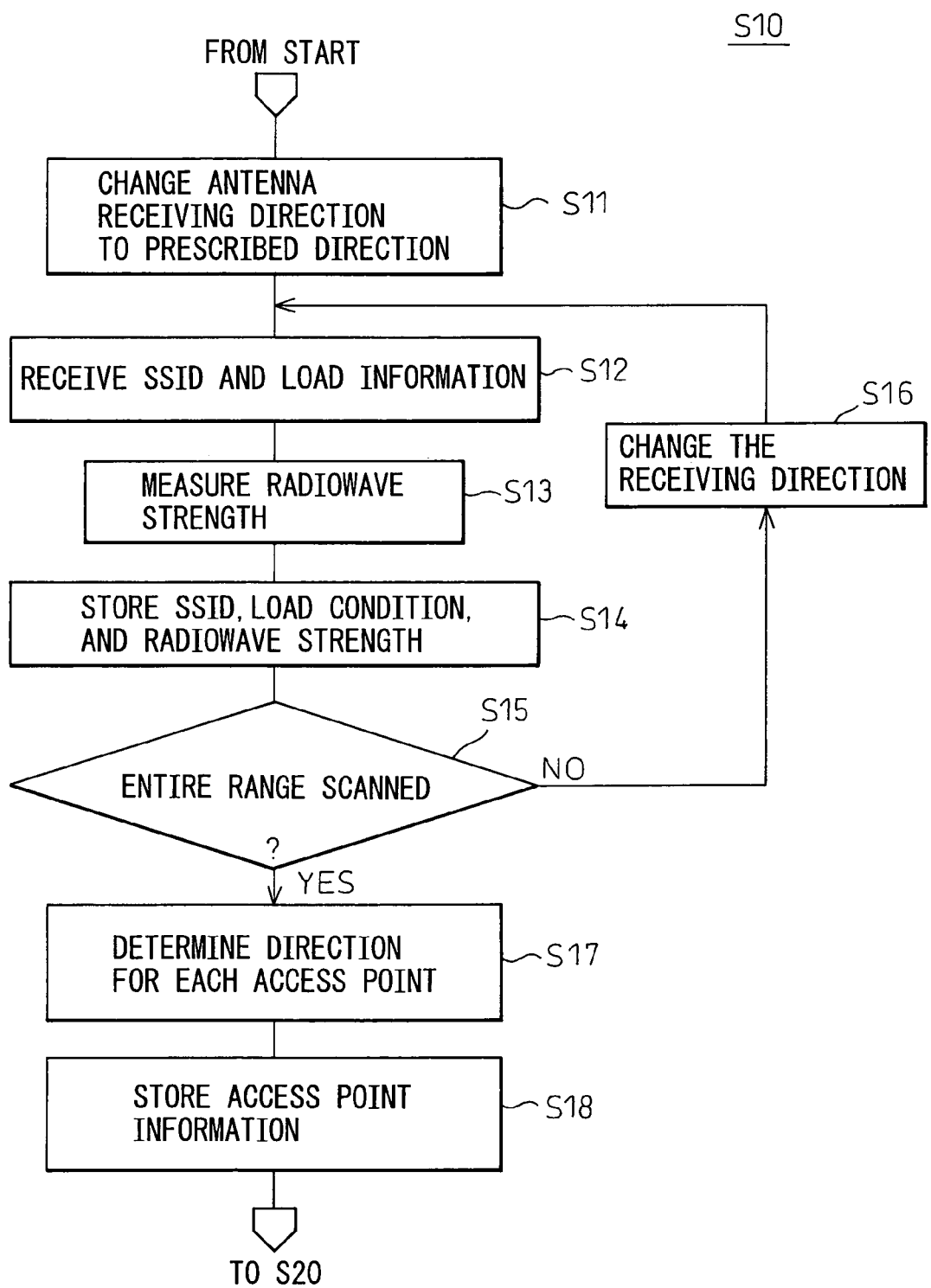
FIG. 11 is a flowchart illustrating an access point identification routine shown in FIG. 9.

FIG. 11 is a flowchart illustrating the access point identification routine S10 shown in FIG. 9. In the access point identification routine S10, the mobile terminal MT gathers information concerning each access point AP in the surrounding area (hereinafter referred to as the "access point information"), such as the SSID as the identification information of the access point AP, the direction (azimuth angle and elevation angle) in which the access point AP is located as viewed from the mobile terminal MT, the strength of the radiowave power (dBm value) received from the access point AP, the number of mobile terminals MT currently under the control of the access point AP (the number of mobile terminals MT being served by the access point AP), the total of the throughput values (the total throughput value) representing the throughputs between the access point AP and the respective mobile terminals MT being served by it, and the CPU usage rate (CPU load rate) of the overall operation control unit 50 that the access point AP requires to perform communication with the mobile terminals MT being served by it. The data structure of the access point information is shown in FIG. 12.

Turning back to FIG. 11, in step S11, the base station identifying unit 21 sets the directivity of each of the adaptive antennas 10T and 10R in a prescribed scan start direction by means of the directivity control unit 20.

Next, in step S12, the base station identifying unit 21 transmits the identification information request signal via the transmitting adaptive antenna 10T, requesting each access point AP for transmission of the identification information.

On the other hand, in the access point AP, information concerning the number of mobile terminals MT currently under the control of the access point and the throughput value measured by the throughput measuring unit 61 as indicating the throughput used for communication with each mobile terminal MT being served are stored in the load evaluating unit 62, and these values are passed to the load reporting unit 71 when the access point AP has received the identification information request signal.

The load reporting unit 71, based on the output of the load evaluating unit 62, generates load information indicating the load condition of the access point (for example, the number of mobile terminals MT being served by it and the total throughput value representing the total throughput between the access point AP and the respective mobile terminals MT), and the thus generated load information, together with the SSID, is put into the beacon frame in the signal processing circuit 54 and transmitted to the mobile terminal MT.

The base station identifying unit 21 receives the beacon frame via the receiving adaptive antenna 10R and acquires the SSID and load information concerning the access point AP located in that direction. At this time, in step S13, the radiowave strength measuring unit 23 measures the dBm value representing the strength of the radiowave power when the beacon frame is received by the receiving adaptive array antenna 10R.

Then, in step S14, the SSID of the access point AP, the load information, and the received radiowave strength acquired in steps S12 and S13 are stored in the storage unit 24.

Then, the above steps S12 to S14 are repeated (steps S15 and S16) by changing the direction of directivity of each of the adaptive antennas 10T and 10R so that the adaptive antennas 10T and 10R scan the entire range over which the direction of directivity can be changed. In this way, the mobile terminal MT gathers the access point information from all the access points AP located in the surrounding area.

Next, in step S17, of the access point information gathered in the above steps S11 to S16 and stored in the storage unit 24, those pieces of access point information that have the same SSID, that is, the access point information concerning the same access point AP, are compared with each other, and the access point information received from the direction in which the received radiowave strength is the strongest is selected to determine the access point direction associated with that access point AP. In this way, the access point direction is determined for each access point. Thereafter, in step S18, the access point information selected in step S17 is stored in the storage unit 24.

Figure 13:
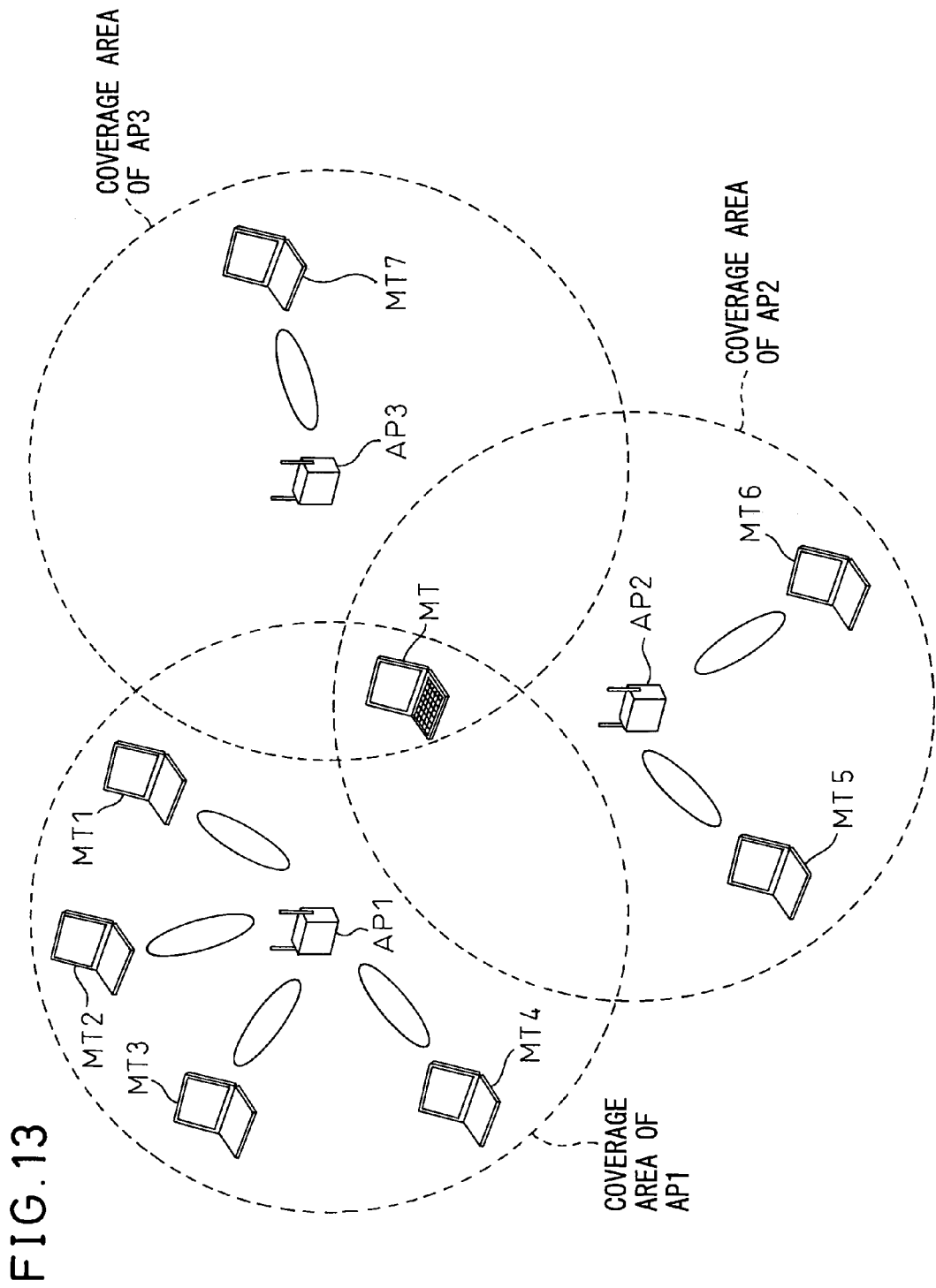
FIG. 13 is a diagram for explaining how the mobile terminal gathers access point information from access points in the surrounding area.

FIG. 14 shows one example of the access point information that the mobile terminal MT shown, for example, in FIG. 13 has gathered from the access points AP1 to AP3 located in the surrounding area.

Next, in accordance with the load condition check routine S20, radiowave strength check routine S30 and radiowave strength increase check routine S40 shown in FIG. 9, the base station selecting unit 22 in the mobile terminal MT selects the appropriate base station from among the base stations associated with the gathered access point information.

Figure 15:
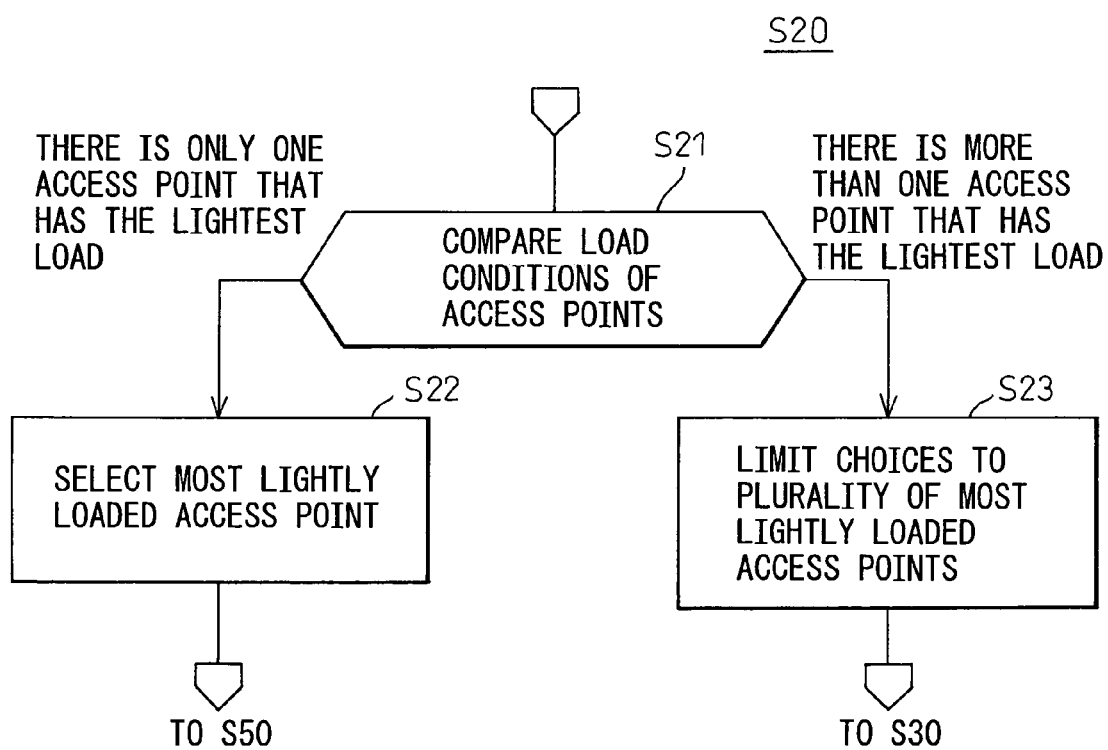
FIG. 15 is a flowchart illustrating a load condition check routine shown in FIG. 9.

FIG. 15 is a flowchart illustrating the load condition check routine S20 shown in FIG. 9. In step S21, the base station selecting unit 22 compares the data items concerning the load conditions of the respective access points AP in the gathered access point information (that is, the number of mobile terminals being served by each access point AP, the total throughput value, or the CPU usage rate). If the result of the comparison shows that there is one access point AP that has the lightest load, then this most lightly loaded access point AP is selected as the serving access point AP in step S22, and the selection process is terminated to return to step S50 in FIG. 9. On the other hand, if the result of the comparison shows that there is more than one access point AP that has the lightest load, choices (candidates) for the serving access point AP are limited to these most lightly loaded access points AP, and the process proceeds to the radiowave strength check routine S30 that follows.

Figure 16:
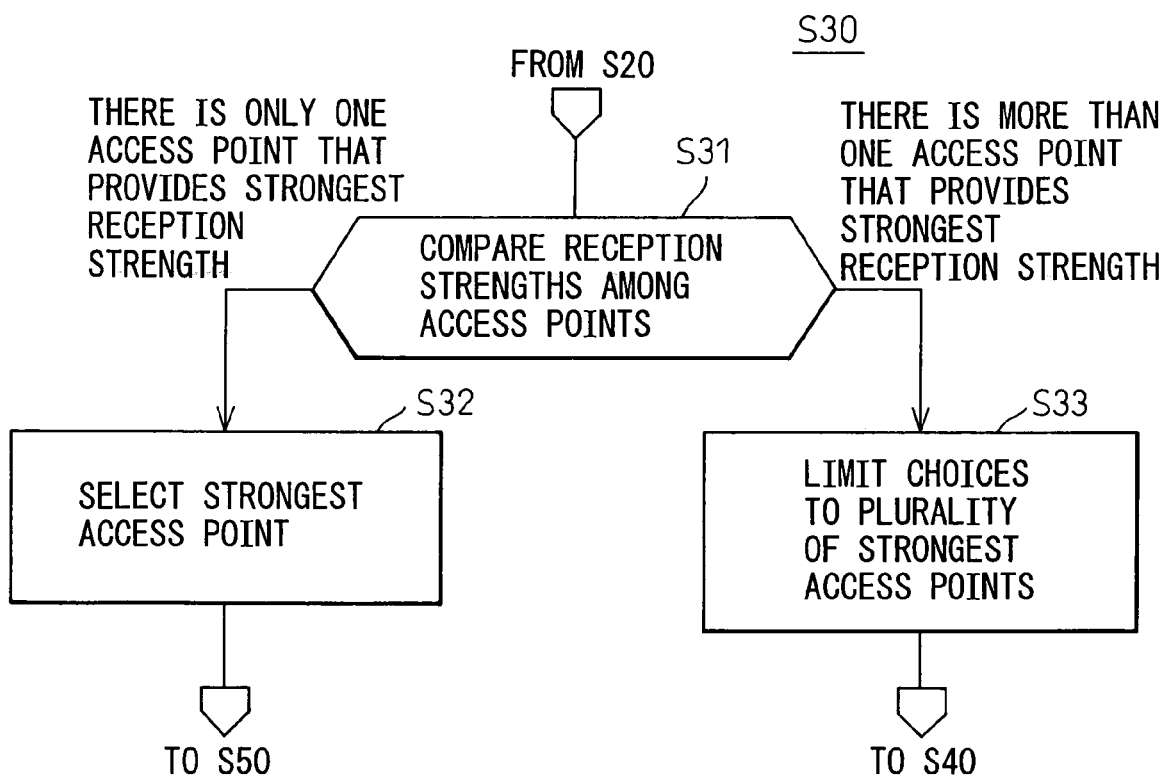
FIG. 16 is a flowchart illustrating a radiowave strength check routine shown in FIG. 9.

FIG. 16 is a flowchart illustrating the radiowave strength check routine S30 shown in FIG. 9. In step S31, the base station selecting unit 22 compares the data items concerning the received radiowave strengths in the access point information for the plurality of access points AP limited in step S23. If the result of the comparison shows that there is only one access point AP that provides the strongest radiowave strength, then this access point AP with the strongest radiowave strength is selected as the serving access point AP in step S32, and the selection process is terminated to return to step S50 in FIG. 9. On the other hand, if the result of the comparison shows that there is more than one access point AP that provides the strongest radiowave strength, choices (candidates) for the serving access point AP are further limited to these access points AP that provide the strongest radiowave strength, and the process proceeds to the radiowave strength increase check routine S40 that follows.

Figure 17:
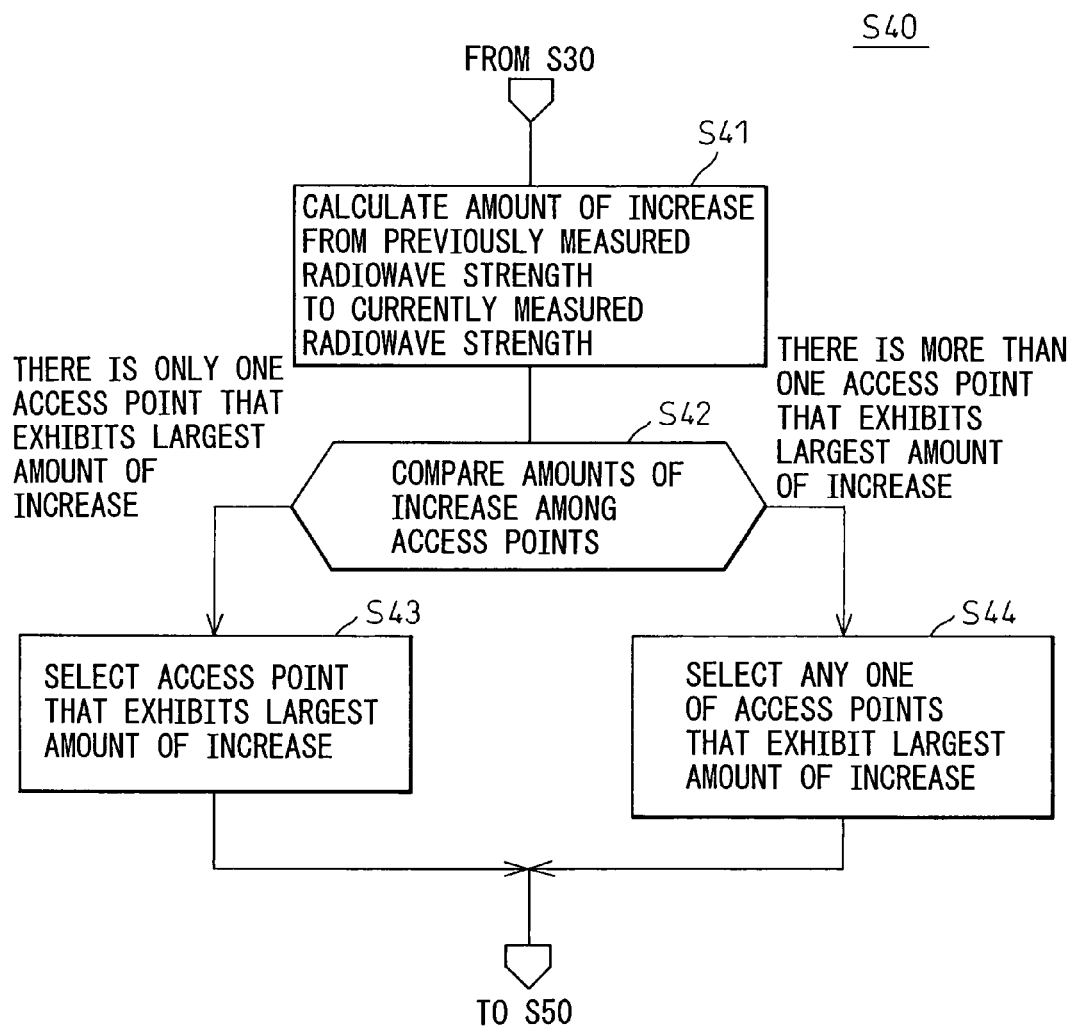
FIG. 17 is a flowchart illustrating a radiowave strength increase check routine shown in FIG. 9.

FIG. 17 is a flowchart illustrating the radiowave strength increase check routine S40 shown in FIG. 9. In step S41, for each of the plurality of access points AP limited in step S33, the base station selecting unit 22 compares the radiowave strength of the access point AP measured in the access point identification routine S10 in the current cycle of process with the radiowave strength of the access point AP measured in the access point identification routine S10 when switching the access point AP in the previous cycle of process, and calculates the amount of increase from the previous measured result to the current measured result.

For this purpose, in the access point identification routine S10 shown in FIG. 11, when storing the access point information in the storage unit 24 in step S18, the access point information previously stored when switching the access point is not simply discarded, but a history, for at least one previous cycle, is stored.

Turning back to FIG. 17, in step S42, the amount of increase in received radiowave strength is compared among the access points AP. If the result of the comparison shows that there is only one access point AP that exhibits the largest amount of increase, then this access point AP with the largest amount of increase is selected as the serving access point AP in step S43, and the selection process is terminated to return to step S50 in FIG. 9. On the other hand, if the result of the comparison shows that there is more than one access point AP that exhibits the largest amount of increase, any one of the access points AP that exhibit the largest amount of increase is selected as the serving access point AP in step S44, and the selection process is terminated.

When the serving access point AP is selected based on the amount of increase as described above, the communication quality improves because, of the plurality of access points AP providing the same radiowave strength for data communication with the mobile terminal MT, the access point AP located in the direction in which the mobile terminal MT is moving (that is, the access point AP toward which the mobile terminal is closing most rapidly) can be selected.

Figure 18:
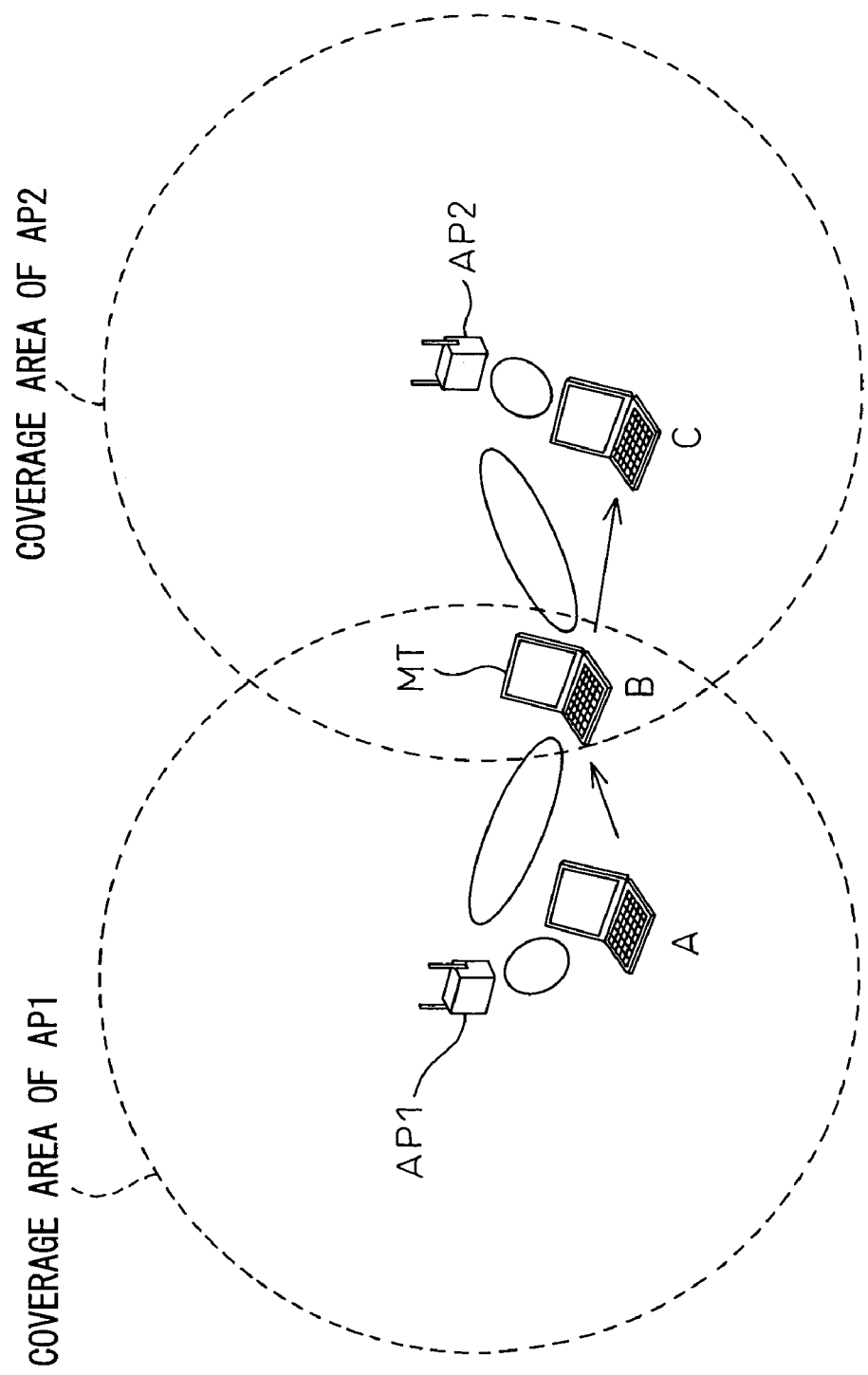
FIG. 18 is a schematic diagram for explaining how an access point is selected based on the amount of increase in radiowave strength.

For example, consider the situation where, as shown in FIG. 18, the mobile terminal MT moves from position A in the coverage area of the access point AP1 to position B at the boundary between the coverage areas of the access points AP1 and AP2, and then moves to position C in the coverage area of the access point AP2.

At position A, the radiowave from the access point AP1 is the strongest, while at position C, the radiowave from the access point AP2 is the strongest; therefore, by selecting the access point providing the strongest radiowave strength, the mobile terminal MT can maintain high communication quality.

However, at position B where the mobile terminal MT is about to leave the coverage area of the access point AP1 and enter the coverage area of the access point AP2, there can occur cases where there is little difference in radiowave strength between the access point AP1 and the access point AP2.

In such cases, if the base station selecting unit 22 selects the access point AP1 as a suitable one of the access points AP1 and AP2 providing the same radiowave strength, the mobile terminal MT may soon go out of the coverage area of the access point AP1.

To address this, the access point AP showing the largest amount of increase in received radiowave strength is selected in the radiowave strength increase check routine S40; this makes it possible to select the access point AP2 that appears to be approaching when viewed from the mobile terminal MT, and thus, the access point within whose coverage area the mobile terminal MT is most likely to stay can be selected from among the access points AP1 and AP2 providing the same received radiowave strength.

As the mobile terminal MT according to the present invention is equipped with the adaptive array antennas 10T and 10R, the radiowave beam that the mobile terminal MT directs to the access point AP to perform communication can be formed narrow. As a result, as previously described with reference to FIGS. 3A and 3B, the coverage area of the access point AP for the mobile terminal MT can be enlarged, while avoiding interference with other access points AP adjacent to it.

As shown in FIG. 3B, with the employment of the adaptive array antenna, the mobile terminal MT can gather the access point information of the access points AP1 to AP3 distributed over a greatly extended area compared with the prior art communication area. As a result, it becomes possible to provide a wider selection to choose from when selecting the serving access point from among the access points AP1 to AP3, and thus an access point AP with lighter load can be selected; this achieves efficient distribution of the load over the access points AP.

In this way, the mobile terminal MT according to the embodiment of the present invention contributes to efficiently distributing the load over the access points AP. However, if the load is concentrated on a particular access point AP for reasons such as the failure of other adjacent access points, there arises a need at the access point AP to reject the connection request from the mobile terminal MT.

In particular, in the case of the wireless communication system according to the present embodiment, as the selection of the access point AP with which to connect is actively made on the mobile terminal MT side, and the access point AP responds passively, the access point AP needs to be equipped with a means for rejecting the connection requested from the mobile terminal MT if the load exceeds a given limit.

For this purpose, as shown in FIG. 8, the access point AP is equipped with the connection rejecting unit 72 for rejecting the communication connection request from the mobile terminal MT if it is determined, based on the output signal of the load monitoring unit 60, that the load condition of the access point AP has exceeded a predetermined threshold.

For example, the connection rejecting unit 72 may be configured to reject the communication connection request from the mobile terminal MT in the following manner; that is, a decision is made at the access point AP as to whether the identification information request signal received by it is one sent from one of the mobile terminals MT currently connected and, if it is not the request signal sent from such a mobile terminal MT, the identification information is not transmitted thereby blocking the mobile terminal MT from acquiring the identification of the access point.

Alternatively, a connection reject signal may be returned to the mobile terminal MT that transmitted the identification information request signal, with provisions made so that in the mobile terminal MT that received the connection reject signal, the base station identifying unit 21 does not identify the access point (for example, does not create access point information).

The present invention is applicable to a wireless communication system comprising a plurality of base stations installed within a wireless communication network and mobile stations which perform wireless communication with such base stations; in particular, the invention can be advantageously applied to wireless LAN systems rapidly spreading in such places as offices and hot-spots.

While the invention has been described with reference to specific embodiments chosen for purposes of illustration, it should be apparent that numerous modifications could be made thereto by those skilled in the art without departing from the basis concept and scope of the invention.

What is claimed is:

1. A mobile station which performs wireless communication with a plurality of base stations installed within a wireless communication network, said mobile station comprising:

an adaptive array antenna whose directivity can be controlled to any desired direction;

a directivity control unit which controls the direction of directivity of said adaptive array antenna;

a base station identifying unit which gathers identification information from each of said plurality of base stations in a surrounding area by changing the direction of directivity of said adaptive array antenna under control of said directivity control unit; and a base station selecting unit which selects an appropriate one of said base stations whose identification information has been gathered, wherein said base station selecting unit takes into account each increasing amount of received radiowave strength measured for said plurality of base stations by using said adaptive array antenna.

2. A mobile station as claimed in claim 1, further comprising:

a radiowave strength measuring unit which measures the strength of a radiowave received from each of said base stations; and a radiowave strength storing unit which stores said received radiowave strength for each of said base stations whose identification information has been gathered, wherein if radiowave strengths which are received from a plurality of base stations respectively are equal, said base station selecting unit selects, from among said plurality of base stations, a base station for which said received radiowave strength measured shows a largest increase in two successive measurements of radiowave strength from the base station.

3. A wireless communication system comprising a wireless communication network, a plurality of base stations installed within said wireless communication network, and a mobile station which performs wireless communication with said plurality of base stations, wherein said mobile station comprises:

an adaptive array antenna whose directivity can be controlled in any desired direction;

a directivity control unit which controls the direction of directivity of said adaptive array antenna;

a base station identifying unit which gathers identification information from each of said plurality of base stations in a surrounding area by changing the direction of directivity of said adaptive array antenna under control of said directivity control unit; and a base station selecting unit which selects an appropriate one of said base stations whose identification information has been gathered, wherein said base station selecting unit takes into account each increasing amount of received radiowave strength measured for said plurality of base stations by using said adaptive array antenna.

4. A wireless communication system as claimed in claim 3, wherein said mobile station further comprises:

a radiowave strength measuring unit which measures the strength of a radiowave received from each of said base stations; and a radiowave strength storing unit which stores said received radiowave strength for each of said base stations whose identification information has been gathered, wherein if radiowave strengths which are received from a plurality of base stations respectively are equal, said base station selecting unit selects, from among said plurality of base stations, a base station for which said received radiowave strength measured shows a largest increase in two successive measurements of radiowave strength from the base station.

* * * * *